US005363756A

United States Patent [19]

Muro

[11] Patent Number: 5,363,756

[45] Date of Patent: Nov. 15, 1994

[54] FRUIT AND VEGETABLE CUTTER

[75] Inventor: Narahiko Muro, Tokyo, Japan

[73] Assignee: Muro Corporation, Tokyo, Japan

[21] Appl. No.: 56,384

[22] Filed: May 4, 1993

[30] Foreign Application Priority Data

May 6, 1992 [JP] Japan .................................. 4-140931

[51] Int. Cl.$^5$ .............................................. A47J 17/00

[52] U.S. Cl. ........................................ 99/538; 99/537; 83/437

[58] Field of Search ................. 99/537, 538, 509, 510; 83/451, 437

[56] References Cited

U.S. PATENT DOCUMENTS

| | | | |
|---|---|---|---|
| 3,830,151 | 8/1974 | Gerson | 99/537 |
| 4,095,518 | 6/1978 | Jones | 99/538 |
| 4,436,025 | 3/1984 | Jones | 99/538 |
| 4,569,280 | 2/1986 | D'Ambro et al. | 99/538 |
| 4,771,682 | 9/1988 | Ishikawa | 99/593 |
| 4,959,903 | 10/1990 | Daoust et al. | 99/537 |
| 5,142,973 | 9/1992 | Tur et al. | 99/537 |

*Primary Examiner*—David A. Scherbel

*Assistant Examiner*—Reginald L. Alexander

*Attorney, Agent, or Firm*—Oblon, Spivak, McClelland, Maier & Neustadt

[57] ABSTRACT

Sanitary processing of fruits and vegetables is assured by cutting a fruit or vegetable steadily held in position into pieces that are then dropped directly onto a dish or other receiver. A cutter assembly 2 steadily held by a base frame is easy to disassemble, and reassemble, for washing and other purposes. The cutter assembly 2 having radially disposed blades 21 fastened to a holding frame 22 is mounted on a base frame 1, with a receiving space 10 provided below. Two guide rods 3 are erected on the base frame to hold a vertically slidable press-down member 4 having a concave pressing surface 42 facing the blades 21. The cutter assembly 2 comprises a holding frame 22 holding the radial blades 21 disposed inward and a projecting cone 23 to fit or stick in the fruit or vegetable to be cut at the center of the blades 21. The holding frame 22 is made up of component members whose lugs 24*b* are fitted in positioning grooves 15 cut in the base frame 1.

12 Claims, 6 Drawing Sheets

FRUIT AND VEGETABLE CUTTER

FIELD OF THE INVENTION

This invention relates to apparatus for cutting fruits and vegetables, particularly citrus fruits whose peel has been stripped to expose their flesh, into equally divided portions with a cutter having radially disposed blades.

DESCRIPTION OF THE PRIOR ART

Various apparatus are known for cutting substantially spherical fruits and vegetables like citrus fruits into portions suited for cooking or eating with an assembly of radially disposed cutting blades, such as the one disclosed in the specification of U.S. Pat. No. 4,569,280.

Such known apparatus essentially comprise a table having a concave surface to support a fruit or vegetable placed thereon, guide rods erected on both sides of the table, and a movable cutter assembly comprising several blades radially disposed in a housing and adapted to be pressed down along the guide rods. The movable cutter assembly pressed down across the fruit or vegetable on the table cuts it into radially divided portions.

The concave surface on the table firmly holds a fruit or vegetable in position and permits steady cutting there of with a descending cutter assembly. However, the cut portions must be removed from the table. Done mostly with hands, this removal has not been very sanitary. Besides, the step of removing the cut portions has inhibited the realization of fully automatic cutters.

Furthermore, the movable cutter assembly must be screwed or otherwise fastened to a vertically movable housing. On the other hand, the cutter blades must be readily detached for washing to ensure that they are always kept clean. These conflicting design requirements have been difficult to satisfy.

SUMMARY OF THE INVENTION

An object of this invention is to provide a fruit and vegetable cutter having none of the drawbacks mentioned above that assures sanitary handling of the cut portions by dropping them directly on to dishes or other containers.

Another object of this invention is to provide a fruit and vegetable cutter having a cutter assembly securely and detachably affixed to a base frame so as to assure ease of disassembling and washing.

Still another object of this invention is to provide a fruit and vegetable cutter having a cutter assembly comprising a holding frame to which the inner end of each blade is fastened through a projecting cone that assures secure assembling of all blades and keeps a fruit or vegetable to be cut in a stable position.

Yet another object of this invention is to provide a fruit and vegetable cutter having a holding frame that is properly positioned and affixed to the periphery of a base frame by using the lugs of the component members of the holding frame.

Further objects of this invention will be made explicit in the following detailed description of preferred embodiments.

To achieve the above objects, a fruit and vegetable cutter according to this invention comprises a base frame, a cutter assembly having radially disposed blades attached to a holding frame that is mounted on the base frame, a space provided therebelow to place a receiving plate, two guide rods erected on the base frame, a vertically slidable press-down member having a concave pressing surface facing the blades on the lower side thereof and supported by the guide rods, and a projecting cone to pierce into a fruit or vegetable to be divided that is erected where the inner ends of the radially disposed blades meet.

The holding frame in the cutter assembly is made up of component members that are annularly assembled by connecting together the lugs at both ends of each member. While one end of each blade is fastened to each component member, the other end is connected together at the center. The cutter assembly is positioned with respect to the base frame by fitting the joint portion of each lug of the component member in a positioning groove provided in the base frame.

The blades affixed to tile holding frame can be connected to each other by downwardly slanting them from the holding frame toward the center and attach them to the projecting cone to pierce into the fruit or vegetable to be cut.

The fruit and vegetable cutter of this invention is suited for citrus fruits and the like that have been peeled, and cored, by a peeling apparatus of the type disclosed in the specification of U.S. Pat. No. 4,771,682. The projecting cone at the center of the cutter assembly on the base frame is inserted in the cored hole in a fruit, for example, or otherwise pierced into the center thereof. Then, the press-down member is lowered, with the concave pressing surface thereof kept in contact with the fruit thus stably placed on the cutter assembly. The descending radially disposed blades cut the fruit into several portions that fall therethrough into the receiving space therebelow.

Thus, the cut portions fall directly on to a dish or other container placed in the receiving space, without coming in contact with the hands of the operator. Also, provision may be made to take out the cut portions automatically by passing an automatically running conveyor through the receiving space.

A downward force invariably acts on the cutter assembly during cutting operations. No upward force to disconnect the cutter assembly from the base frame works thereon. Therefore, the cutter assembly mounted on the base frame, with the lugs of the component members of the holding frame fitted in the positioning grooves in the base frame, stably remains in position. The cutter assembly, accordingly, can be readily detached from the base frame, washed and returned into the assembled condition.

The projecting cone erected at the center of the radially disposed blades and put in the cored hole of a fruit or vegetable helps hold it firmly in position.

The blades downwardly slanted from the holding frame toward the center and connected to each other by the projecting cone at the center also holds the fruit or vegetable mounted on the cutter assembly steadily in position. During cutting, furthermore, the blades exerts a force to press the fruit or vegetable being cut toward the center of the cutter assembly. This force permits the cut pieces to be taken out in one limp from below, without scattering in many directions.

DESCRIPTION OF THE PREFERRED EMBODIMENTS

Figure 1:
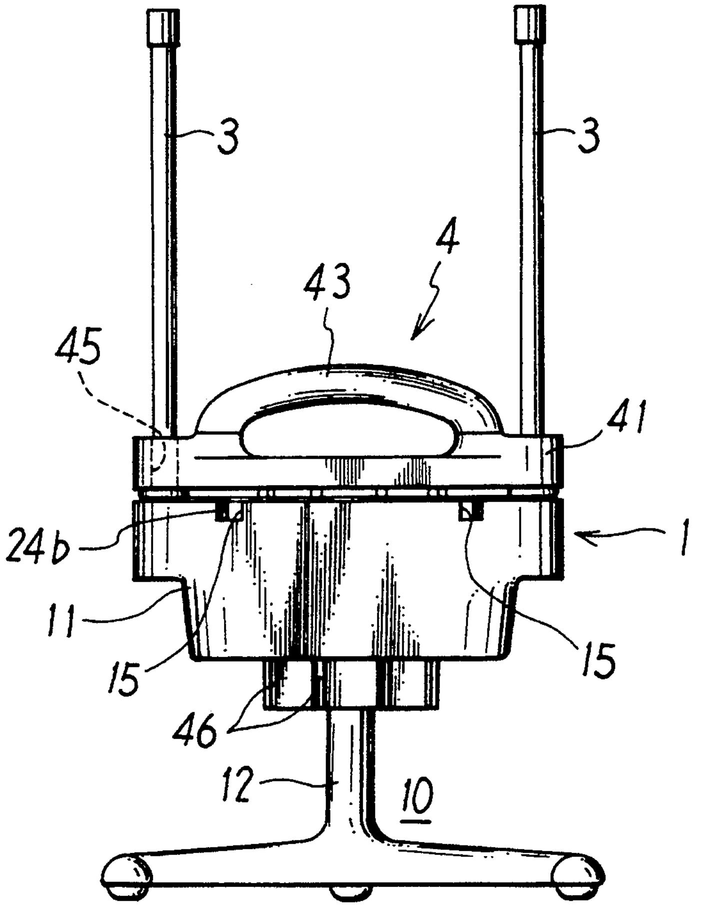
FIG. 1 is a front view showing a preferred embodiment of a vegetable and fruit cutter according to this invention.
Figure 2:
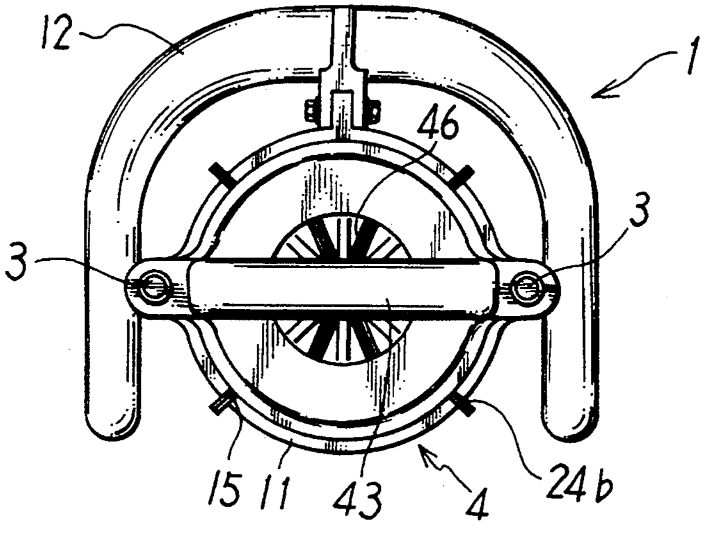
FIG. 2 is a plan view of the same cutter.
Figure 3:
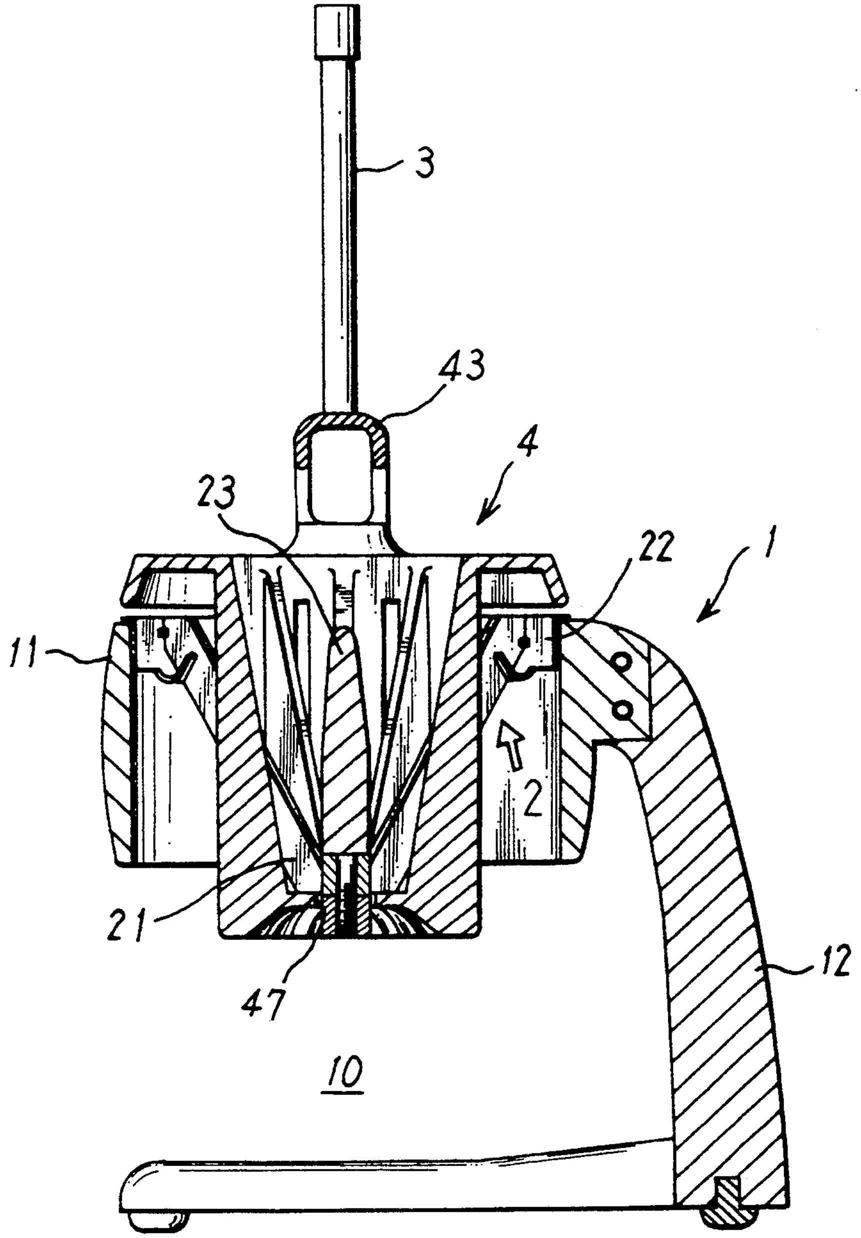
FIG. 3 is a vertical cross-sectional side elevation of the same cutter.

The accompanying drawings illustrate the construction of a preferred embodiment of a fruit and vegetable cutter according to this invention.

The fruit and vegetable cutter of this invention is suited for cutting various fruits and vegetables, including citrus fruits, that have been peeled and cored. The radially disposed blades of the cutter cuts a fruit or vegetable into equally divided portions. As is obvious from FIGS. 1 to 5, the cutter comprises a base frame 1, a cutter assembly 2 mounted on the base frame 1, paired guide rods 3 erected on the base frame 1, and a press-down member 4 vertically slidable along the guide rods 3.

The base frame 1 comprises an annular frame 11 horizontally supported by a leg 12, with the cutter assembly 2 fitted in the circular space at the center. A space 10 to place a dish, moving table or other appropriate device to receive the cut fruit or vegetable is provided below the cutter assembly 2. The paired guide rods 3 are diagonally erected on the outside of the annular frame 11. Large quantities of fruits or vegetables can be processed by passing a conveyor through the space 10. The leg 12 may be made up of three or more rods equally spaced around the annular frame 11.

The annular frame 11 is adapted to accommodate the holding frame 22 of the cutter assembly 2 to be described in detail.

The cutter assembly 2 fitted in the annular frame 11 on the base frame 1 has radially disposed blades 21 whose outer end is fastened to each component member of the regular octagonal holding frame 22, as shown in FIGS. 5 to 9. A projecting cone 23 erected at the center of the radially disposed blades 21 is put in the cored hole of a fruit or vegetable or otherwise pierced into the center thereof.

Figure 6:
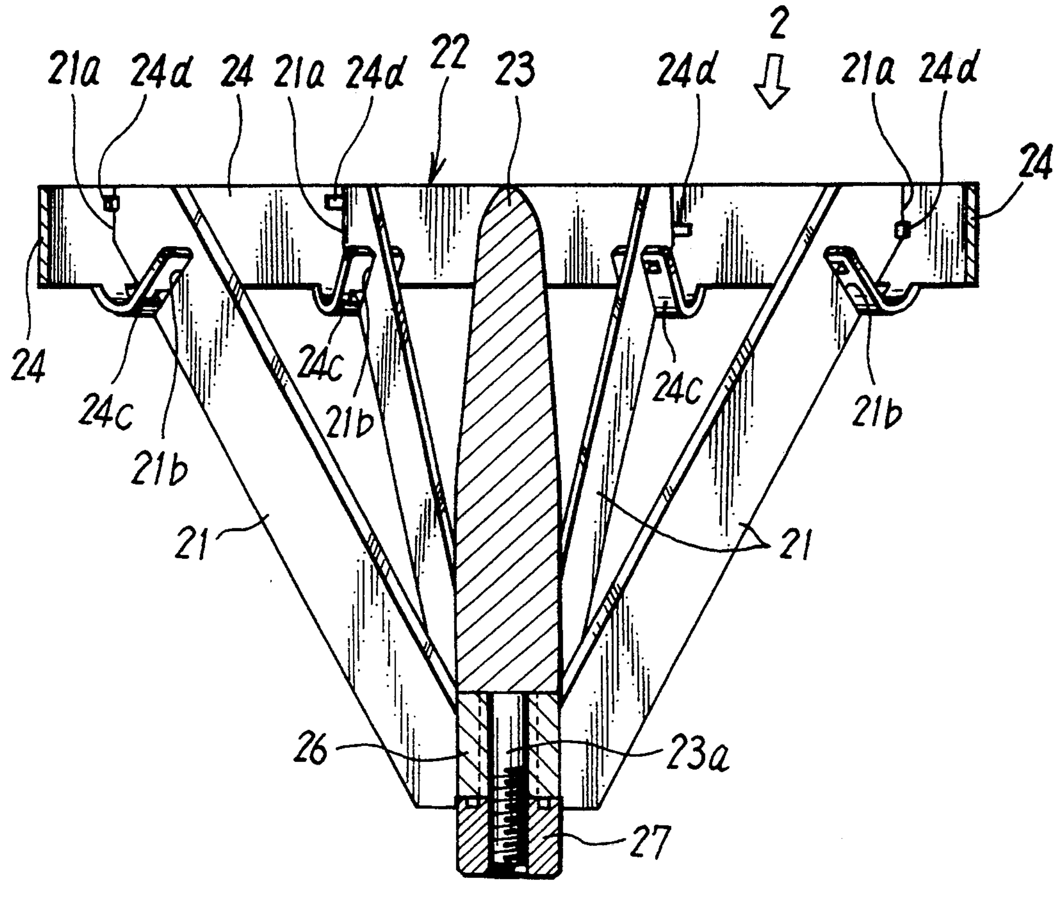
FIG. 6 is a cross-sectional side elevation of the cutter assembly of the same cutter.
Figure 5:
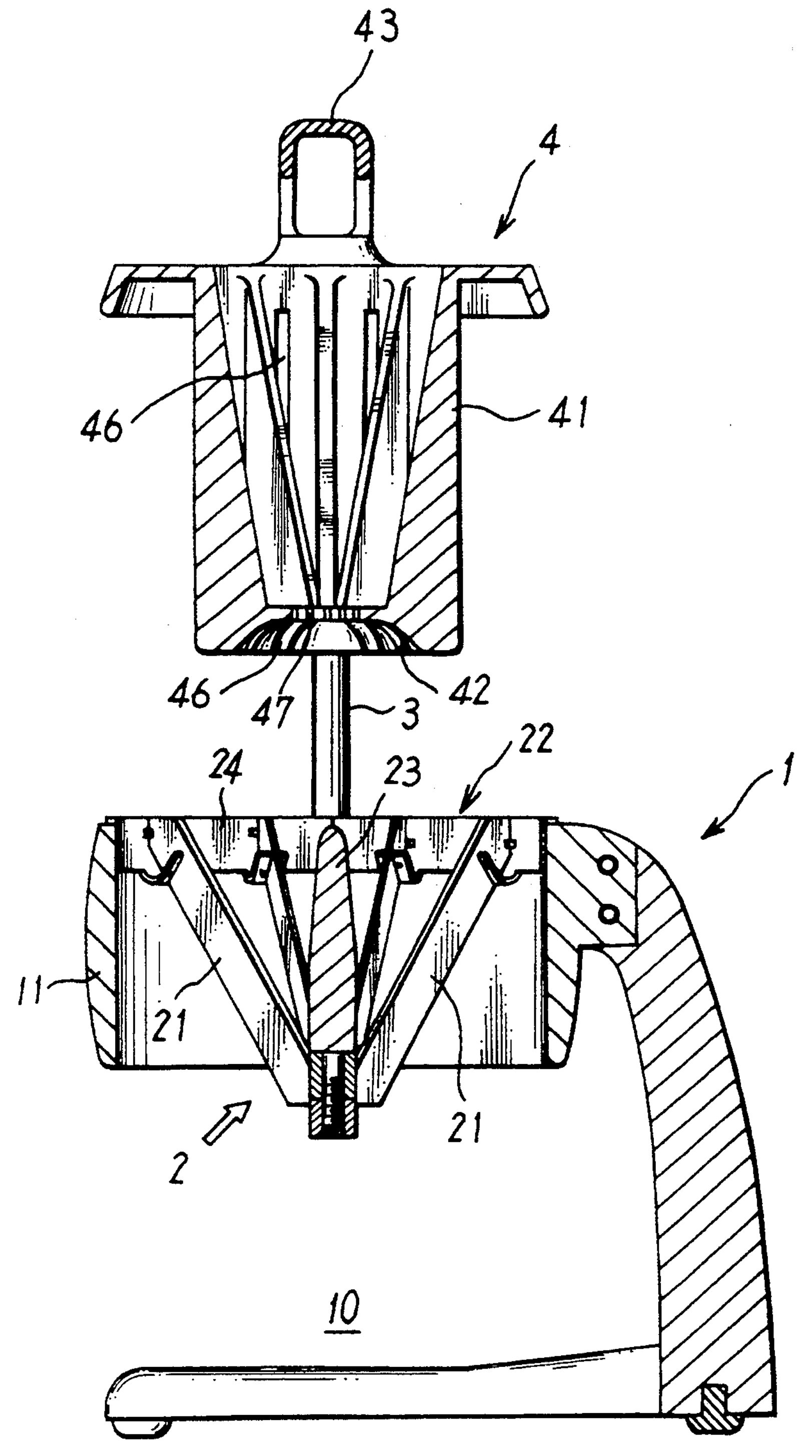
FIG. 5 is a vertical cross-sectional side elevation of the same cutter in which the press-down member is elevated along the guide rods.
Figure 7:
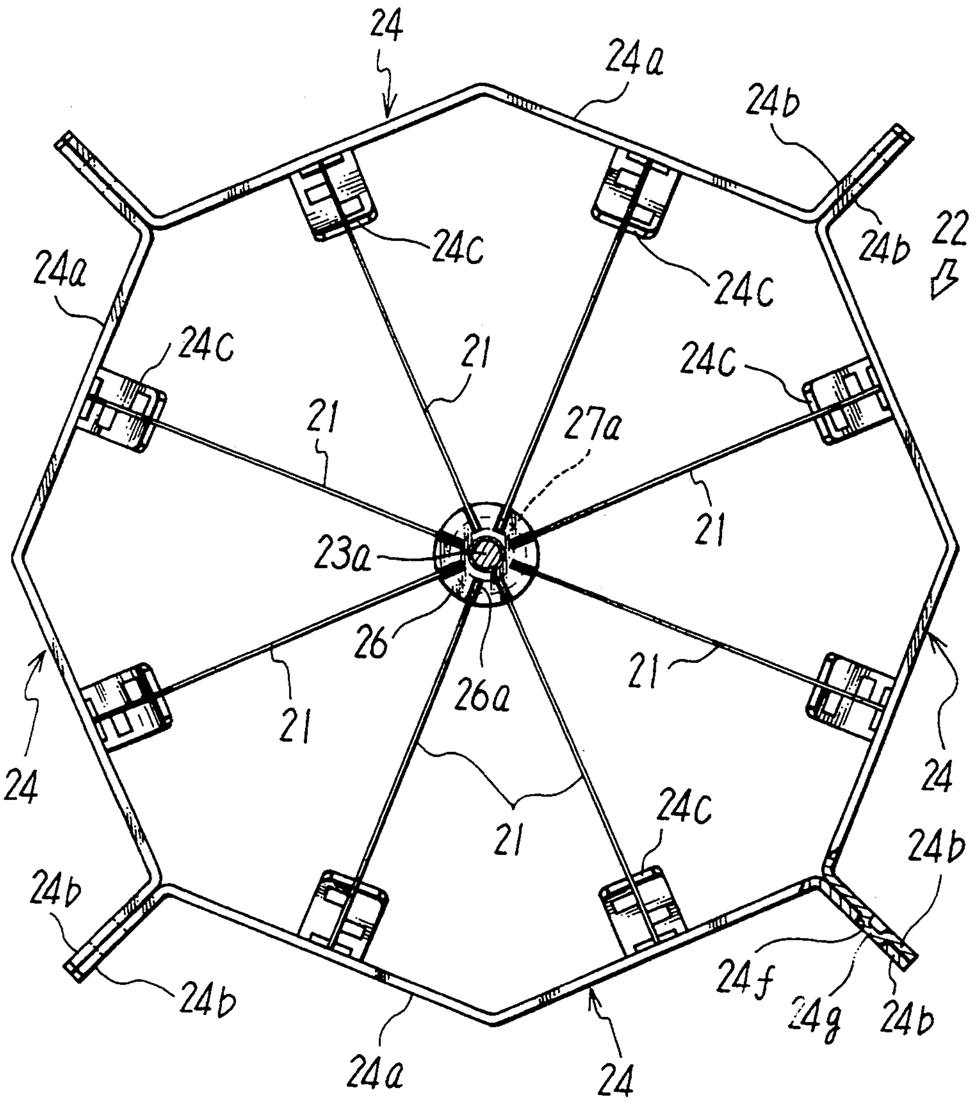
FIG. 7 is a plan view of the cutter assembly with the projecting cone cut open.
Figure 8:
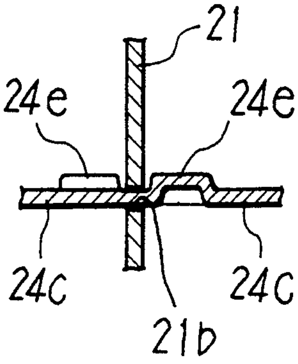
FIG. 8 is a partially cross-sectional view of the blade affixed to the component member of the holding frame viewed from the cutting direction.

As is obvious from FIGS. 6 and 7, four equally shaped component members 24 make up the octagonal holding frame 22. Each component member 24 comprises a strip 24*a* that constitutes two sides of a regular octagon, with two lugs 24*b* formed at both ends thereof. A polygonal holding frame 22 is formed by joining together the lugs 24*b* of the component members 24. Each component member 24 is formed by bending a metal strip. The regular octagonal holding frame 22 of the embodiment being described is made up of four component members 24 that are linked together to hold eight equally spaced blades 21. The shape of the holding frame 22 is by no means limited to regular octagon. Holding frames of various polygonal shapes can be formed by joining together different numbers of differently shaped component members 24.

The component member 24 has a curved hold 24*c* projecting from the lower edge of the strip 24*a* to hold the blade 21 in position. Blade holding projections 24*d* and 24*e* (see FIG. 8) are provided on the strip 24*a* and curved hold 24*c* in such a manner as to hold the blade 21 therebetween. The blade holding projections 24*d* and 24*e* are formed by pressing a small area of the strip 24*a* and hold 24*c* from behind. This fabrication can be facilitated by vertically staggering the holding projection on both sides of the blade. FIG. 6 shows the vertically staggered holding projections 24*d*, whereas FIG. 7 shows the holding projections 24*e* staggered along the length of the hold 24*c*.

While one end of each blade 21 is fastened to the holding frame 22 with the edge thereof turned upward, the other end thereof is downwardly slanted toward the center. The blade 21 is fastened to the holding frame 22 by bringing the vertical upper end 21*a* thereof in contact with the strip 24*a* by placing between the holding projections 24*d* thereon and fitting a slit 21*b* (see FIG. 9) in the upper end of the blade 21 between two holding projections 24*e* on the curved hold 24*c*.

Figure 9:
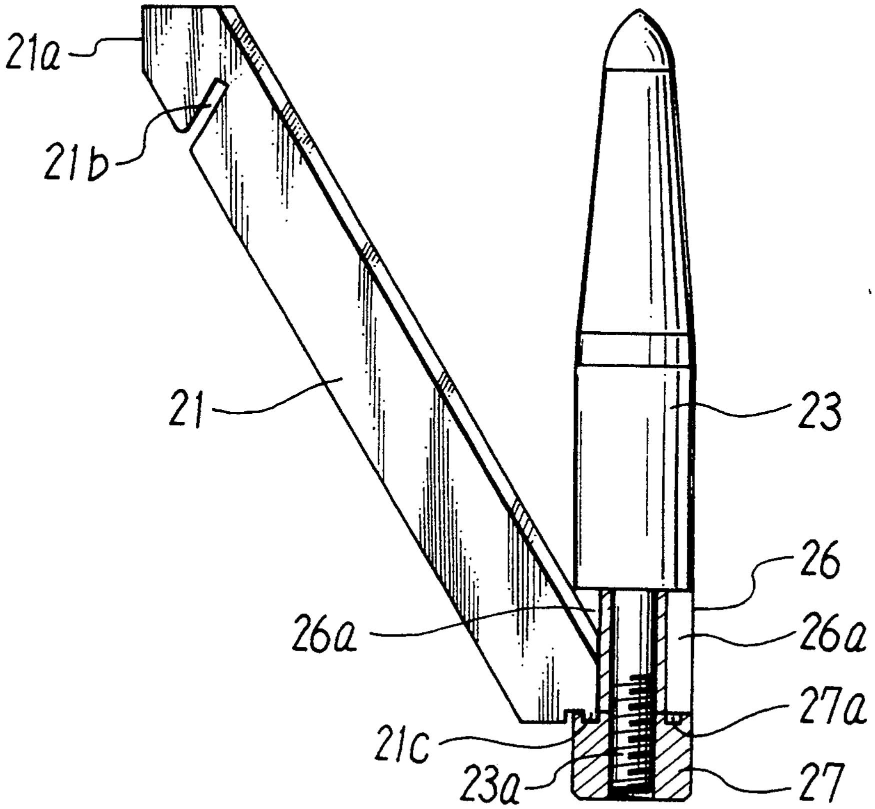
FIG. 9 is a cross-sectional view showing the principal part of the cutter assembly.

The projecting cone 23 erected at the center of the radially disposed blades 21 on the cutter assembly 2 is shaped like a projectile having a threaded rod 23*a* projecting downward. As shown in FIGS. 7 and 9, a metal holder 26 having radially cut grooves 26*a* to hold the lower end of the blades 21 fitted therein is fitted over the threaded rod 23*a*. The blades 21 are fastened in position by screwing a nut 27 onto the threaded rod 23*a*.

To be more specific, each blade 21 has an engaging projection 21*c* at the lower end thereof, as shown in FIG. 9. After the lower ends of the blades 21 have been inserted in the radially cut grooves 26*a* in the metal holder 26, the engaging projections 21*c* are engaged with an engaging groove 27*a* cut in the nut 27 to fix the blades 21 in position. The nut 27 screwed onto the threaded rod 23*a* jointly fasten the inner ends of the blades 21. Thus the projecting cone 23 keeps both the assembled blades and the fruit or vegetable being cut in a stable position.

The illustrated projecting cone 23 is intended for a fruit or vegetable that is simultaneously peeled and cored at the center. For uncored fruits and vegetables, a thinner cone having a pointed piercing end can be used. Also, provision may be made to permit using projecting cones of different shapes for different types of fruits and vegetables.

The lugs 24*b* of the adjoining component members 24 are linked together by fitting a projection 24*g* on one lug 24*b* in a small hole 24*f* perforated in the other lug 24*b*. Thus, all component members 24 are identically shaped.

The cutter assembly 2 is fitted together by placing the holding frame 22 in the annular frame 11 on the base frame 1 from above. The circular position of the holding frame 22 is fixed by fitting the engaging part of the lugs 24*b* thereon in the positioning grooves 15 provided in the annular frame 11 on the base frame 1.

As such, the cutter assembly 2 can be detached from the base frame for washing or replacement by just lifting with hands. The cutter assembly 2 can also be readily returned to the original position by mounting it on the annular frame 11 and fitting the lugs 24*b* in the positioning grooves 15.

Figure 4:
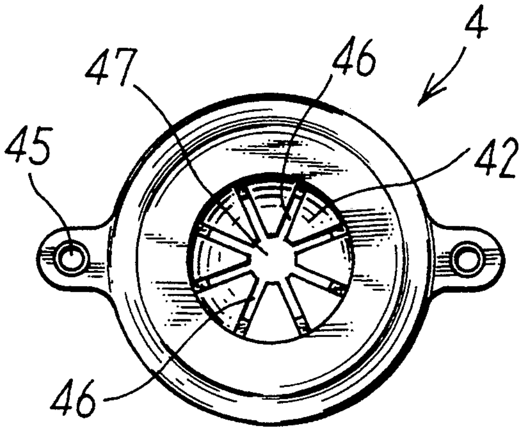
FIG. 4 is a bottom view of the press-down member of the same cutter.

As shown in FIGS. 1 to 5, the guide rods 3 erected on the base frame 1 hold a vertically slidable press-down member 4 having a concave pressing surface 42 to press the fruit or vegetable placed on the cutter assembly 2 thereagainst. The press-down member 4 comprises a press-down member proper 41 having a grip 43 at the top thereof and guide holes 45 to pass the diagonally positioned guide rods 3. The lower cylindrical part of the press-down member 4 has radial escape grooves 46 through which the radially disposed blades 21 run down when the press-down member 4 is pressed down and a central hole 47 in which the projecting cone 23 of the cutter assembly 2 is to be fitted, as shown in FIG. 4. The lower cylindrical part also has the concave pressing surface 42 facing the cutter assembly 2 at the bottom thereof.

A balancing mechanism to keep the press-down member 4 spring-urged upward may be provided between the guide rods 3 and the press-down member 4. This balancing mechanism permits lifting the press-down member 4 with less force.

The fruit and vegetable cutter described above is chiefly suited for peeled and cored fruits and vegetables, such as citrus fruits. With the press-down member 4 raised along the guide rods 3 (FIG. 5), a fruit or vegetable is steadily placed on the cutter assembly 2, with the projecting cone 23 at the center of the cutter assembly 2 mounted on the annular frame 11 on the base frame 1 inserted in a hole cored at the center of the fruit or vegetable or, otherwise, stuck in the uncored center thereof. The projecting cone 23 is conducive to keeping the fruit or vegetable being cut in a stable position.

The concave pressing surface 42 at the bottom of the press-down member proper 41 presses the fruit or vegetable against the radially disposed blades 21 when the press-down member 4 is lowered along the guide rods 3, whereupon the blades 21 cut the fruit or vegetable into pieces that fall through between the blades 21 onto a dish or other container placed in the space 10. Thus, the cut pieces of fruit or vegetable sanitarily fall directly onto the dish without touching the hands of the operator.

During the cutting operation, a downward force invariably acts on the cutter assembly 2. No upward force to disconnect the cutter assembly 2 from the base frame 1 works thereon. Therefore, the cutter assembly 2 can be placed in position by simply mounting it on the annular frame 11 on the base frame 1. The annular frame 11 on the base frame 1 steadily keeps the mounted cutter assembly 2 in position. The cutter assembly 2 can also be readily dismounted from the annular frame 11 on the base frame 1 for disassembling and washing. Therefore, the blades 21 are always kept clean and are readily replaced by loosening the nut 27.

What is claimed is:

1. A fruit and vegetable cutter, comprising:
   (a) a base having a bottom surface adapted to rest on a substantially horizontal surface, said base supporting an annular frame at a sufficient distance above said bottom surface to permit a dish to be inserted thereunder;
   (b) a cutter assembly comprising a holding frame mounted in said annular frame, an upwardly projecting cone adapted to fit or stick into a fruit or vegetable centrally located within said holding frame, blades extending radially from an outer end adjacent said holding frame to an inner end adjacent said cone, first means removably fastening the outer ends of said blades to said holding frame and second means removably fastening the inner ends of said blades to said cone;
   (c) a press-down member having a concave pressure surface facing the blades of said cutter assembly;
   (d) a pair of guide rods extending upward from said base to a level above said annular frame, said press-down member being slidably mounted on said guide rods for movement towards said cutter assembly for forcing a fruit or vegetable over said cone and through said blades and for movement away from said cutter assembly to a position where another fruit or vegetable may be placed on said cutter assembly.

2. A fruit and vegetable cutter according to claim 1, wherein said holding frame comprises an annular assembly of component members, each component member having a radially outwardly directed lug at each end thereof, the lugs of adjacent component members are fastened together to form said annular assembly, and each of the outer ends of said blades is removably fastened to one of said component members by said first means.

3. A fruit and vegetable cutter according to claim 2, wherein said annular frame has an upper surface, a plurality of radially extending circumferentially spaced grooves in the upper surface of said annular frame, each pair of adjacent lugs on said holding frame resting in a respective one of said radially extending circumferential grooves in the upper surface of said annular frame for supporting said cutter assembly with respect to said annular frame and for preventing rotation between said holding frame and said annular frame.

4. A fruit and vegetable cutter according to claim 3, wherein said blades slant downwardly from the location where they are removably fastened to said holding frame to the location where they are removably fastened to said cone.

5. A fruit and vegetable cutter according to claim 4, wherein said component members comprise a plurality of strips which in assembled condition form a regular octagonal holding frame, and wherein said first means removably fastens the outer end of one or more of said radially extending blades to each side of said regular octagonal holding frame.

6. A fruit and vegetable cutter according to claim 5, wherein the regular octagonal holding frame comprises four identically shaped component members each comprising a strip bent into a form corresponding to two sides of a regular octagon.

7. A fruit and vegetable cutter according to claim 2, wherein each of the component members comprises a metal strip and said first means comprises on each strip at least one curved blade hold projecting inward from the lower edge thereof and each said metal strip and each said blade hold have blade hold projections formed to hold the outer end of one of said blades therebetween, each of said blades having a sharp upper surface and a lower surface, said first means further comprising each of said blades having a slot adjacent the outer end thereof extending from the lower surface toward the upper surface, each of said blades being removably fastened to said holding frame by a blade hold inserted in the slot in the blade and with the blade between the blade holding projections on the blade hold and with the end of the blade engaging the metal strip between the blade holding projections thereon.

8. A fruit and vegetable cutter according to claim 7, wherein said cone is shaped like a projectile, said second means comprising a threaded rod extending from the lower end of said cone, a metal holder having radially extending grooves therein positioned over said metal rod, the inner end of each of said blades being positioned in a respective one of said radial grooves in said holder, and a nut threaded on said threaded rod for removably securing the inner ends of said blades to said cone.

9. A fruit and vegetable cutter according to claim 8, wherein the inner end of each of said blades includes a downward projection, the upper end of said nut includes a circumferentially extending recess which receives the downward projection on the inner end of each of said blades when said nut is fully threaded on said threaded rod.

10. A fruit and vegetable cutter according to claim 1, wherein said vertically slidable press-down member further comprises a lower cylindrical part having radial escape grooves through which the radially disposed blades of said cutter assembly run down when said press down member is moved toward said cutter assembly, said lower cylindrical part further defining a central hole receiving said cone of said cutter assembly when the press-down member is moved toward said cutter assembly, and the bottom of said lower cylindrical part defining a concave pressing surface facing said cutter assembly.

11. A fruit and vegetable cutter, comprising:

(a) a base having a bottom surface adapted to rest on a substantially horizontal surface, said base supporting an annular frame at a sufficient distance above said bottom surface to permit a dish to be inserted thereunder;

(b) a cutter assembly comprising a holding frame mounted in said annular frame, an upwardly projecting cone adapted to fit or stick into a fruit or vegetable centrally located within said holding frame, blades fastened at one end to said holding frame extending radially from said holding frame towards said cone and fastened at the other end to said cone, said holding frame comprising an annular assembly of component members, each component member having a radially outwardly directed lug at each end thereof, the lugs of adjacent component members fastened together to form said annular assembly, and each of said blades is fastened at its radially outward end to one of said component members and fastened at its radially inward end to said cone;

(c) a press-down member having a concave pressure surface facing the blades of said cutter assembly;

(d) a pair of guide rods extending upward from said base to a level above said annular frame, said press-down member being slidably mounted on said guide rods for movement toward said cutter assembly for forcing a fruit or vegetable over said cone and through said blades and for movement away from said cutter assembly to a position where another fruit or vegetable may be placed on said cutter assembly.

12. A fruit and vegetable cutter according to claim 11, wherein said annular frame has an upper surface, a plurality of radially extending circumferentially spaced grooves in the upper surface of said annular frame, each pair of adjacent lugs on said holding frame resting in a respective one of said radially extending circumferential grooves in the upper surface of said annular frame for supporting said cutter assembly with respect to said annular frame and for preventing rotation between said holding frame and said annular frame.

* * * * *